United States Patent [19]
Llabres et al.

[11] 4,313,718
[45] Feb. 2, 1982

[54] METHOD FOR THE MANUFACTURE OF FLEXIBLE DISKS AND APPARATUS FOR PERFORMING THIS METHOD

[75] Inventors: Raymond Llabrés; Robert Antoine; Jean P. Lacotte; Charles Marchi, all of Paris, France

[73] Assignee: Thomson-CSF, Paris, France

[21] Appl. No.: 109,041

[22] Filed: Jan. 2, 1980

[30] Foreign Application Priority Data

Jan. 4, 1979 [FR] France ............................... 79 00199

[51] Int. Cl.³ ............................................. B29D 17/00
[52] U.S. Cl. .................................... 425/290; 264/107; 264/155; 425/810
[58] Field of Search ....................... 264/107, 155, 156; 425/290, 810

[56] References Cited

U.S. PATENT DOCUMENTS

| | | | |
|---|---|---|---|
| 1,407,633 | 9/1964 | Phillipson | |
| 3,221,367 | 12/1965 | Cavalier | 18/5.3 |
| 3,298,059 | 1/1967 | Sakamoto | 425/810 X |
| 4,085,178 | 4/1978 | McNeely | 264/155 X |
| 4,213,927 | 7/1980 | Alberti | 425/810 X |

*Primary Examiner*—Thomas P. Pavelko
*Attorney, Agent, or Firm*—Oblon, Fisher, Spivak, McClelland & Maier

[57] ABSTRACT

Method for the manufacture of flexible disks from engraved moulds by means of a compression press comprising starting with a roll of plastic material and bringing a strip of material between the open plates of a compression press without making a preliminary hole in said strip. A preliminary hole is made during the closing of the plates by means of a first punch matched to a complementary punch, said punches serving as centering means for the two moulds, then by the guidance of the first punch in the complimentary punch for the centering of the moulds with respect to one another. The central hole is cut when the plates are closed by means of the complementary punch which is maintained in the raised position throughout the end of the pressing cycle.

3 Claims, 7 Drawing Figures

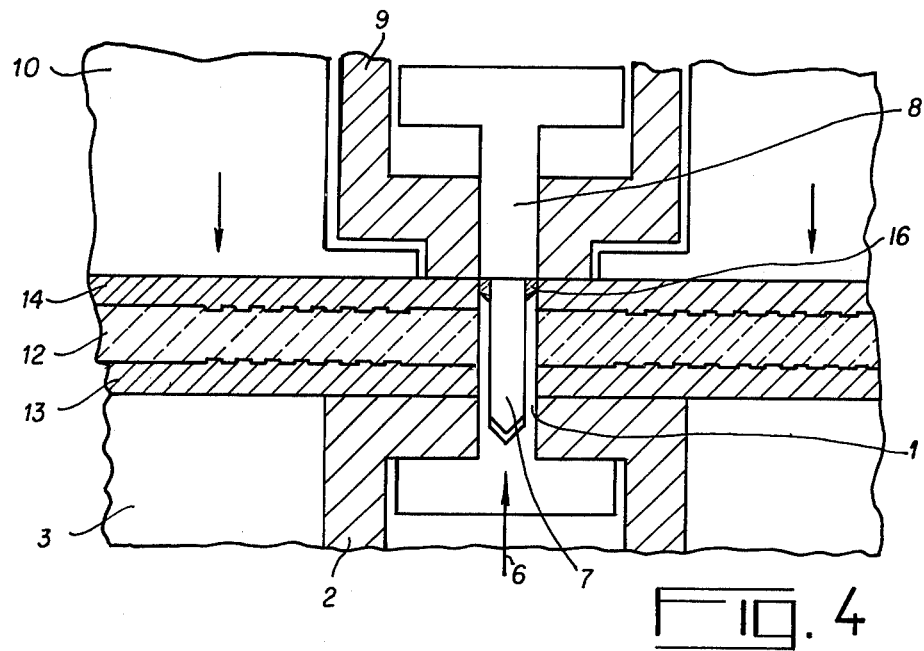
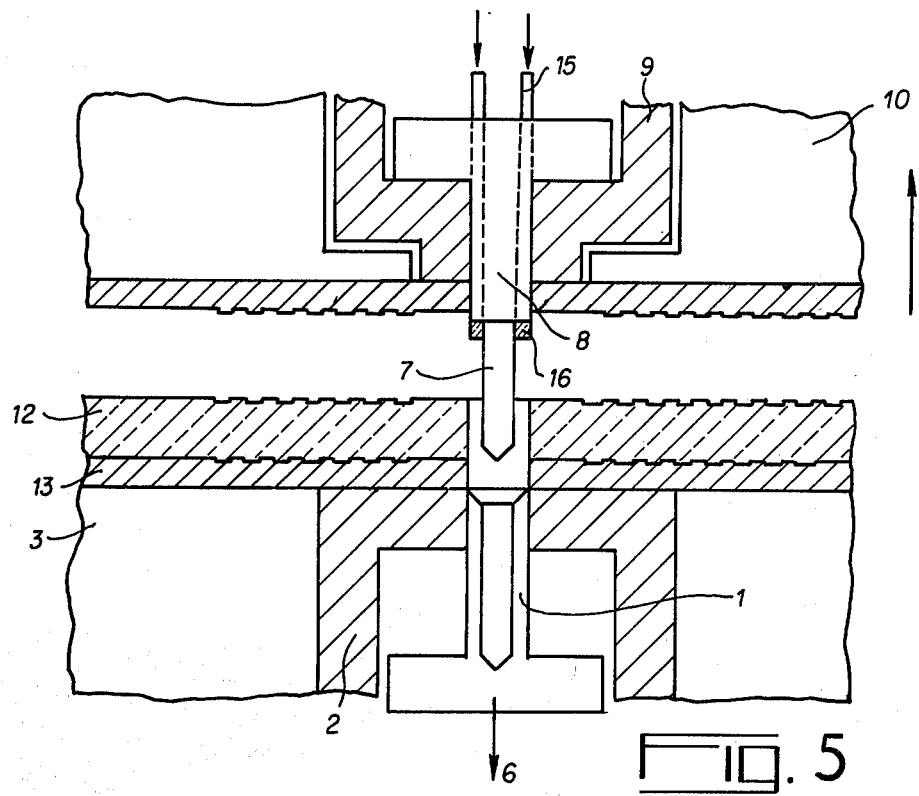

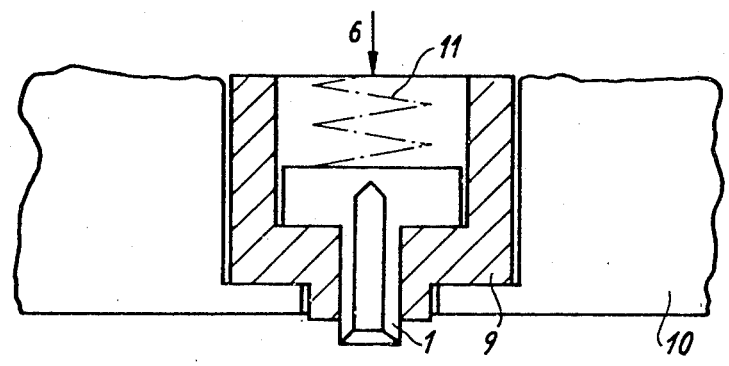
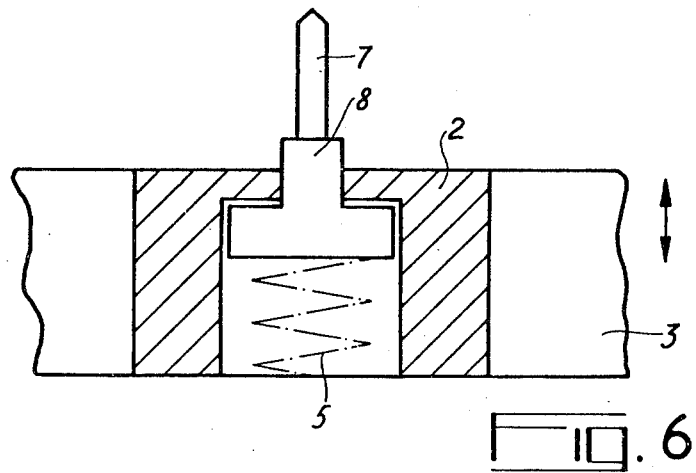
Fig. 6
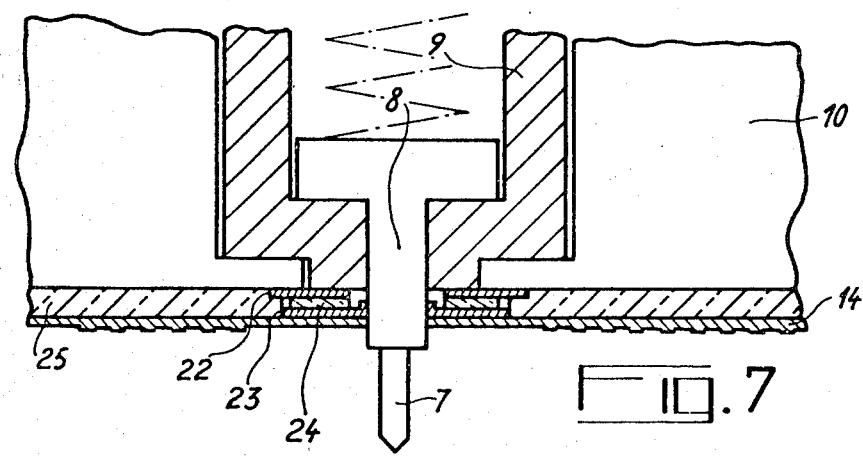
Fig. 7

METHOD FOR THE MANUFACTURE OF FLEXIBLE DISKS AND APPARATUS FOR PERFORMING THIS METHOD

BACKGROUND OF THE INVENTION

The invention relates to the manufacture of flexible disks or records which can be optically read by concentrated radiation and more specifically to a method for the manufacture of such disks and to an apparatus for performing this method.

Optically legible disks are generally such that the information is recorded on a track in the form of microdepressions, whose width is approximately 1 micrometer and length is variable. This track can be in the form of concentric circles or can be spiral track, the pitch between the grooves in the radial direction being between 1.5 and 2 $\mu$m. Such disks make it possible to record a large quantity of optically legible data. Reading is obtained by diffraction of radiation concentrated on the plane containing the data when the disk is rotating, the reading device having vertical and radial slaving devices making it possible to maintain the focusing point of the reading beam on the track. Reading can be carried out by transmission or by reflection. In the case of reading by transmission, a disk recorded on its two sides can be read without being turned over by merely moving the focusing plane of the reading beam. When the track is a spiral track and if the spirals are in opposite directions on the two sides, the disk can be read in a continuous manner, without interruption for passing from one side to the other. Thus, the reading of the first side is carried out by following a given radial progression direction and then at the end of the track the focusing plane of the beam is brought onto the second side, without any radial displacement of the beam head and the second side is then read by following the radial progression direction, which is opposite to that of the first side.

Thus, such a reading device by transmission can permit a continuous reading of a program which can take up to 1 hour and a random access to one of the sides, by merely modifying the focusing plane of the reading beam.

However, for such a device to function in a completely satisfactory manner, it is absolutely necessary, taking account of the dynamics of the radial control and of the density of the recorded information, that centering defects of the disk with respect to the reading device and consequently the off-centering of the central hole of the disk with respect to the track does not exceed about 20 microns. Thus, the manufacturing process by pressing such disks must be such that the eccentricity faults remain within this range.

In the manufacturing methods used for flexible audio disks, the operation of drilling the central hole can be performed by punching the disk, still located on the pressing means following the pressure-temperature cycle. In the case of rigid audio disks obtained by injection moulding or thermal compression, the material can be injection moulded or thermally compressed around a centering means, the central hole being obtained by moulding during the pressing operation. The centering of engraved moulds or dies with respect to the perforated disk is then obtained by means of a spindle having a conical bearing surface, which also serves for the fixing of the moulds to the heating plates. During the closing of the plates, alignment is ensured by guide rods or pins. The centering of the spiral with respect to the central hole is obtained to within 150 to 200 $\mu$m, which is quite adequate for the contact reading of audio disks. However, such an eccentricity is excessive for the optical reading of disks carrying data recorded on a 1 $\mu$m wide track with a pitch of 1.6 $\mu$m. In the case of such disks, more precise centering means must be used.

Another method involves carrying out the drilling of the central hole on a compression press with lateral rods but, in view of the precision required, it is not possible to centre the two plates carrying the engraved moulds from the lateral centering members which would be fixed to the periphery of the plates, because expansion phenomena have an asymmetrical character, when a single plate is heated and as a result the problem of centering engraved moulds is not solved.

BRIEF SUMMARY OF THE INVENTION

The method according to the invention makes it possible to obviate the disadvantages of the above-mentioned methods and is more particularly applicable to two-sided disks, whose two sides are pressed simultaneously, the two moulds being previously centered relative to one another. The central hole is made during pressing, the position of the hole being obtained from the positioning of the moulds.

The invention more specifically relates to a method for the manufacture of flexible disks engraved on at least one side by means of a compression press having a fixed plate and a moving plate between which is advanced in stepwise manner a strip of material to be pressed, a first engraved mould being carried by one of the plates and a second engraved mould or countermould, being carried by the second plate, wherein it comprises perforating the strip during the moving together of the two plates by means of a punch of diameter $d_1$ having a base of diameter $d_2 > d_1$ forming a centering means for the corresponding mould and sliding in a sleeve provided for this purpose in the moving plate, $d_1$ being the diameter of the preliminary hole and $d_2$ the diameter of the central hole to be cut into the strip, followed by the centering of the two moulds during the end of the closing phase, the punch of diameter $d_1$ being guided in a second punch of diameter $d_2$ sliding in a sleeve provided for this purpose in the other plate and used as a centering means for the corresponding mould, said second punch being perforated by a funnel-shaped hole whose bottom of diameter $d_1$ is adjusted to the first punch, the sleeve located in the upper plate being movable in said plate in order to permit centering, the centering means and the second punch gripping the strip of material when the plates are closed, followed by the performance of pressing and the perforation of the central hole by means of the second punch to which is applied a sufficient force for shearing the material with respect to the mould carried by the moving plate, the second punch being maintained in the working position throughout the end of the pressing cycle. The diameter of the hole is then calibrated by moulding about the punch maintained in the working position.

The invention also relates to an apparatus for performing the above method having a compression press whose central column or rod has the elements necessary for performing the method and more specifically a first punch of diameter $d_1$ provided with a centering means of diameter $d_2$ sliding in a sleeve which floats with respect to the corresponding plate in order to carry out the first perforation, a second punch of diameter of $d_2$ having a funnel-shaped hole adapted to the first punch and means for applying to said second punch a force which is sufficient for cutting a hole of diameter $d_2$ in the strip.

BRIEF DESCRIPTION OF THE DRAWINGS

The invention is described in greater detail hereinafter relative to non-limitative embodiments and the attached drawings, wherein show:

FIGS. 2, 3, 4 and 5 the central zone of the same apparatus during certain phases of the present manufacturing method.

FIG. 6 diagrammatically, a second embodiment of the apparatus for performing the method of manufacture according to the invention.

FIG. 7 in detail, the central part of the plate carrying the punch which can be centered.

DETAILED DESCRIPTION OF THE PREFERRED EMBODIMENTS

The apparatus for performing the method according to the invention, which can be adapted to any compression or moulding press is such that the centering of an engraved mould or die with respect to the upper mould or die is obtained by aligning their respective axes prior to closing the heating plates in such a way that no sliding is necessary during the closing in order to obtain said centering, because sliding can lead to damage to the engraved surface of one or other mould carrying the information.

The moulds used are centrally perforated, the punch employed for making the central hole of the disk acting by shearing the material with respect to the edge of the central hole of the mould. The diameter of the hole cut in the moulds to the value required for the hole on the disk when perforated is carried out cold or a higher value, taking account of the contraction which occurs after demoulding as a function of the material, when the perforation of the hole on the disk is performed hot. In both cases, the clearance provided between the punch and the mould does not exceed 5 $\mu$m, in such a way that the positioning of the hole with respect to the engraving of the moulds is obtained with a high degree of accuracy.

Figure 1:
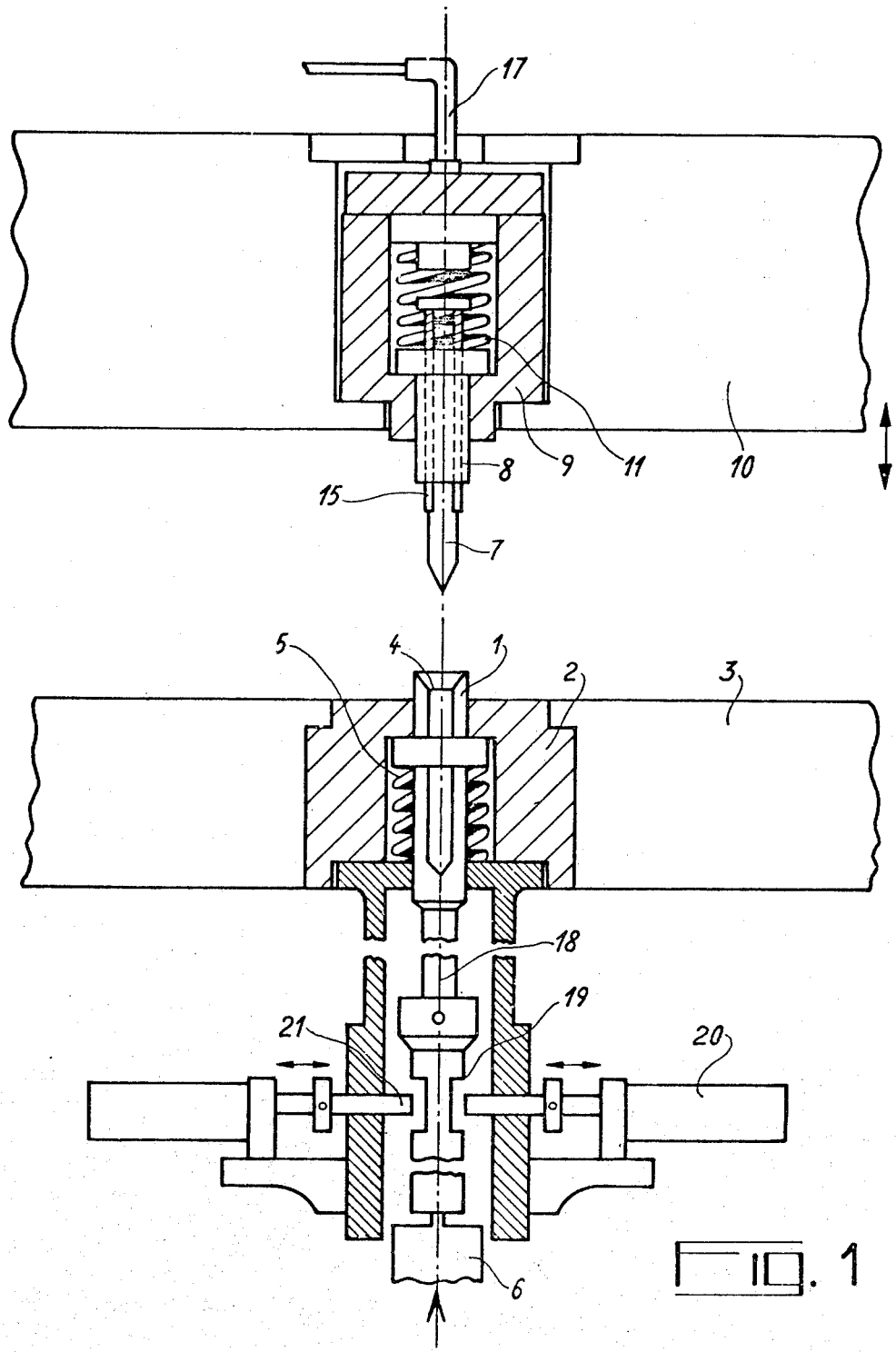
FIG. 1 a section of an embodiment of the apparatus for performing the method for the manufacture of flexible disks according to the invention.

The inoperative apparatus is shown in detail in FIG. 1 and essentially has a first retractable punch of diameter $d_2$ equal to the diameter of the central hole of the disk 1 to be perforated, i.e. 15 mm for example, said punch sliding in a sleeve 2. This punch is used as the central means for the first mould on the lower fixed plate 3, the sleeve 2 being fixed to the lower plate. This punch has a calibrated hole 4, which is funnel-shaped and whose bottom has a diameter $d_1$ equal to that of the preliminary hole to be made on the disk, i.e. 7 mm for example. The rise and fall movement of the punch 1 can be controlled either by pressure on a spring 5 or by a pneumatic jack 6 supplying a force greater than the force necessary for cutting. The apparatus also has a second retractable punch 7 of the same diameter as the calibrated hole 4 provided with a centering means 8 of the same diameter as punch 1, sliding in a floating sleeve 9. A cavity is provided in the upper moving plate 10 for housing the floating sleeve. Punch 1 and punch 7 are machined whilst fitted into one another in such a way as to be perfectly matched. The rise and fall movement of punch 7 and the associated centering means 8 is controlled by pressure on a spring 11. With the first mould positioned on the lower plate by means of punch 1, the second mould is positioned on the upper plate 10 and as a result of the possible floating of its spindle and the matching of the two punches, said second mould is precisely centered with respect to the first mould when the second punch is engaged in the first punch.

When inoperative, the floating sleeve 9 appears as an extra thickness compared with the flat portion of plate 10 in such a way that when a mould is placed on plate 10 about centering means 8, the sleeve rises slightly in its enclosure and no longer abuts on the plate. If such an arrangement was not provided the friction of the sleeve on the plate would impair the centering of the mould carried by the upper plate with respect to the mould carried by the lower plate. The punch 1 can be locked in position by means of a jack 20 acting on an abutment 21 locking the punch axis 18, a slot 19 being provided for this purpose.

The pressing process performed in a hot compression mould having such an apparatus for centering the moulds and making the central hole in the disk has the following phases described with reference to FIGS. 2 to 5.

Figure 2:
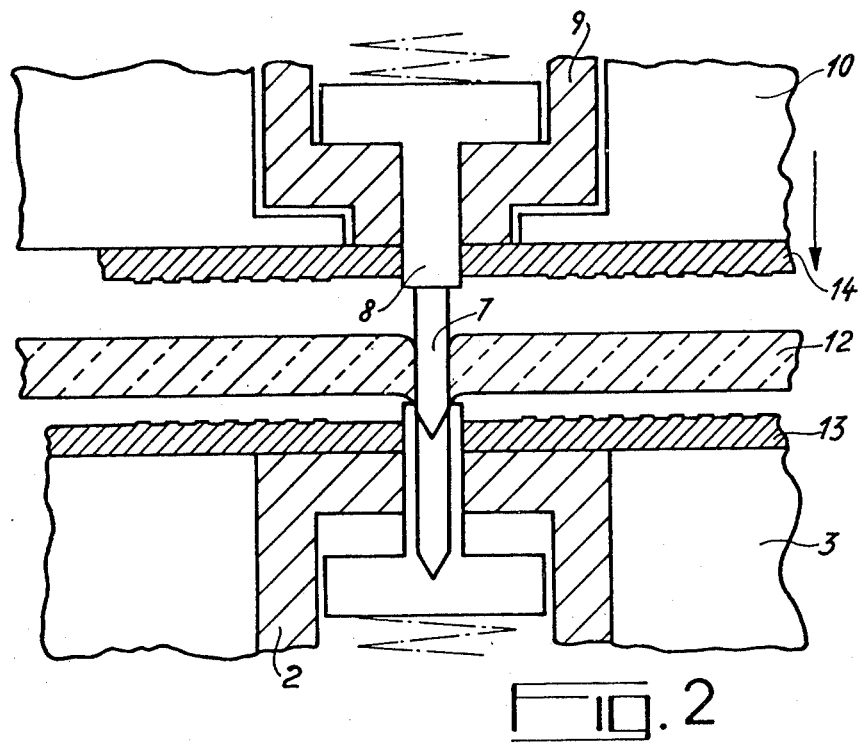

In a first phase, the plastic material to be pressed is brought between the two plates 3 and 10 in the form of a strip 12, said plates being remote from one another and carrying the two moulds 13 and 14. The plastic material is then perforated by punch 7, during the downward movement of the upper plate. At the end of this first phase, the apparatus is shown in FIG. 2. The two springs 5 and 11 are calibrated in such a way that the perforation of the plastic material 12 by centering means 8 is obtained without the two punches being retracted.

Figure 3:
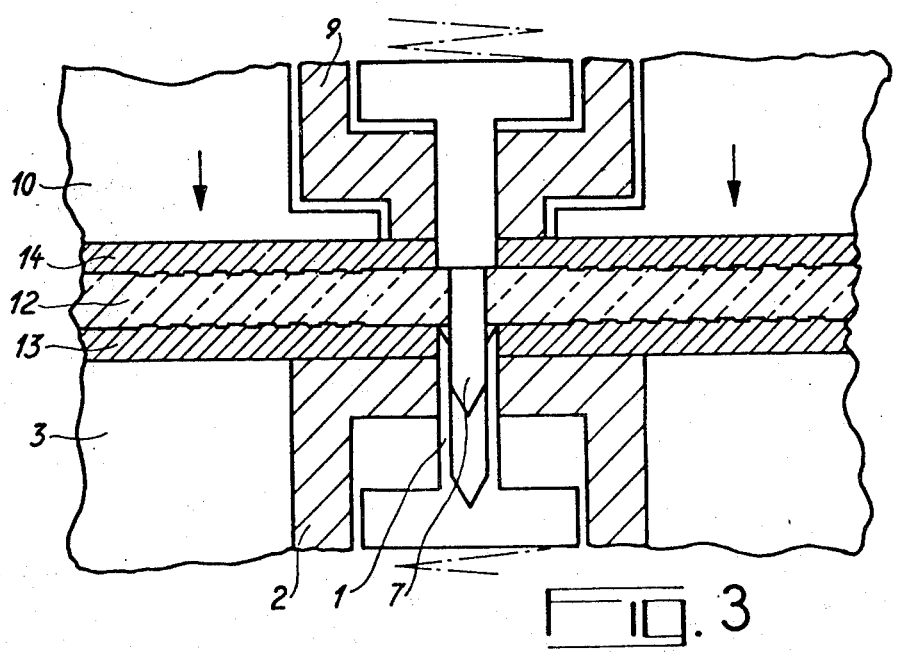

In a second phase, the engraved moulds 13 and 14 are centered with respect to one another by means of punches 1 and 7. For this purpose, the upper plate is moved towards the lower plate and punch 7 is engaged in punch 1. The plates are still not closed. The punches are then retracted by an amount equal to their height by which they project beyond the plane of the engraved moulds. The springs then ensure the gripping of the plastic sheet between the punches without permitting cutting to take place. FIG. 3 shows the apparatus at the end of this second phase. The pressing of the disk is carried out when the plastic film is gripped between the two punches 1 and 7. The heating plates 3 and 10 subject the film to the pressure-temperature cycle necessary for pressing purposes.

It is also during this pressing stage that the central hole is cut. For this purpose, punch 1, displaced by pneumatic jack 6, pushes the plastic material and therefore punch 7, so that the material is sheared with respect to the upper mould. This operation is carried out at a temperature where the shear stress is at a minimum, i.e. the highest temperature. This position is maintained during cooling in such a way that the plastic material is moulded around the punch 1. The diameter of the central hole is then calibrated by the diameter of punch 1. The pressing apparatus at the end of this phase is shown in FIG. 4.

In the fourth phase, the upper plate is raised again, whilst the jack is still in the position corresponding to the upper position of punch 1. Then, with the upper plate in the upper inoperative position, punch 1 is brought level with the lower mould 13 by the control of pneumatic jack 6, i.e. into a low position compared with the inoperative position in which punch 1 projects beyond the mould. The disk is then no longer held in its centre. This position of the apparatus is shown in FIG. 5.

The final phase consists of demoulding the thus moulded disk by separating it from the lower mould by a demoulding device controlled by the upward movement of the moulding plate and the strip can then be advanced for a further pressing operation. The shaving 16 resulting from the perforation by punch 1 remains fixed between the centering means 8 and punch 7 and is ejected by means of ejectors, such as 15 controlled by compressed air entering the interior of sleeve 9 by duct 17 (FIG. 1). This shaving is then discharged by a directional injection of compressed air so as to move it out of the pressing zone.

In a cold pressing process, the apparatus functions in the same way, except that the temperature at which perforation takes place during the moulding cycle can now no longer be linked with the shear stresses.

The information-carrying moulds used can be nickel moulds obtained by an electroplating process. Their hardness is then less than that of the punches and the moulds can be damaged as a result of the punching by shear between the punch 1 and the upper mould (when punching is carried out from bottom to top).

To obviate this disadvantage, it is possible to previously treat the central areas of the moulds by giving them a chromium-plating surface treatment to a thickness of 4 to 5 $\mu$m. It is also possible to add to the mould a joined pellet of treated steel having the same hardness as the punches and of the same diameter as punch 1.

The invention is not limited to the apparatus for performing the manufacturing method described hereinbefore. In particular, in this apparatus the punch 1 has been assumed as sliding in a fixed guide with respect to the corresponding plate, punch 7 and the associated centering means 8 assume to slide in a moving guide and the guide being realised in a sleeve which floats in a cavity provided for this purpose in the upper plate. This arrangement is by no means limitative and the punch 7 for performing the first perforation of the disk can slide in a guide which is fixed with respect to the plate, the punch 1 serving for performing the final cutting operation sliding in a moving guide with respect to the corresponding plate. This arrangement can be of interest when the upper plate is fixed and pressing is carried out by moving the lower plate upwards. The punching of the central hole can then be carried out by a punch acting from top to bottom and the first perforation by a punch carried by the lower moving plate acting from bottom to top. Such a construction is diagrammatically shown in FIG. 6 in which the lower plate 3 is the moving plate and the upper plate 10 is fixed. Punch 7, which must be carried by the moving plate for carrying out the first perforation to diameter $d_1$, which is less than the diameter $d_2$ of the final central hole, is thus placed in the sleeve 2 which is fixed relative to plate 3. Punch 1 which is used for the final cutting operation and which is carried by the fixed plate is placed in the sleeve 9, which floats with respect to plate 10. The pneumatic jack 6 associated with said punch is placed on the side of the fixed plate.

In the description given hereinbefore, the moulds are described as being placed directly against the plates of the compression press. In practice, elastic cushions or pads are provided between the moulds and the plates so as to pneumatically compensate defects which could be suffered by the rear faces of the moulds and as a result the pressure is made uniform over the entire surface of the compressed material.

The elastic cushion can be a sheet of foam perforated in its centre with the same diameter as the engraved mould. However, due to the very elasticity of the cushion, when the travel of the punch is such that it is retracted with respect to the cushion, the latter deforms and engages on the punch path. During perforation, a ring of the elastic cushion is engaged between the two punches as a result of this creep phenomenon and is cut at the same time as the disk. After a number of perforating operations, there is a danger of the engraved mould being deformed due to the fact the the elastic cushion has lost its initial shape in the centre. To obviate this disadvantage, a supplementary device, shown in FIG. 7, is provided on the plate carrying the floating sleeve 9, between engraved mould 14 and sleeve 9, in the central area of the elastic cushion. This device is in the form of a silent block shock absorber and comprises two metal washers 22 and 23 between which is stuck a rubber washer 24. The elastic cushion 25 is perforated to the externaldiameter of the metal washer 23 on which bears the central portion of the engraved mould 14. The elastic cushion can creep without entering the sliding area provided between plate 10 and sleeve 9 for the centering of the mould, said area being protected by washer 22, whose external diameter exceeds the diameter of the hole provided in the plate for the sliding of the sleeve. Moreover, the rubber washer provided between the two metal washers makes it possible to retain a certain flexibility in the central area.

Such an apparatus can be adapted to a compression press and more particularly to a press guided by a central column. For a hot operating compression press the heating and cooling means can be of a random nature. Heating can, for example, be obtained by electrical resistors, steam circulating in the plates or other fluids which can be heated. Cooling can, for example, be obtained by a circulation of water, glycol-containing water or air.

The pressed material can be a PVC film or a PVC-coated polyester film. In the latter case, due to the fact that the material is more mechanically stable, the central hole obtained in the material will have more stable dimensions, but the shear stress is higher, so that the mould is more rapidly worn. It may then be necessary to use centrally reinforced moulds. In general terms, the clearances between the central hole of the moulds and the centering means 8 of punch 1 and the clearances necessary for the sliding of the punches in their sleeves are of the order of 4 to 5 $\mu$m, whilst the clearance between the floating sleeve and the corresponding plate can be approximately 1 to 2 mm.

What is claimed is:

1. An apparatus for manufacturing flexible disks having a compression press with a fixed plate and a moving plate, a punch of diameter $d_1$ provided with a base of diameter $d_2 > d_1$ forming a centering means, $d_1$ being the diameter of a preliminary hole and $d_2$ the diameter of a central hole to be cut in the disks, said punch being able to slide in a sleeve provided for this purpose in one of said plates, a second punch of diameter $d_2$ having a funnel-shaped hole whose bottom has a diameter $d_1$ is accurately adapted to the first punch, said second punch being able to slide in a sleeve provided for this purpose in the other of said plates, the sleeve located in the upper plate being movable therein so as to permit the guidance of the first punch in the second punch, the apparatus also having means for applying a force which is at least equal to the force necessary for making said preliminary hole with said first punch and a force which is at least equal to that necessary for making said central hole with said second punch.

2. An apparatus according to claim 1, wherein said two punches are, in the operative state, maintained in position by means of springs calibrated to substantially equal values and in such a way that said centraling means linked with said first punch and said second punch project beyond the corresponding moulds before the closing of the plates and are retracted so as to be at the same level as the moulds when said plates are closed.

3. An apparatus according to claim 2, wherein a shock absorber formed by two metal washers stuck to a rubber washer surrounds the punch carried by said upper plate to isolate an elastic cushion serving as a support for the mould engraved with said punch.

* * * * *